United States Patent
Chang

(10) Patent No.: US 6,942,079 B2
(45) Date of Patent: Sep. 13, 2005

(54) POWER CORD WINDING AND RELEASING DEVICE

(76) Inventor: Kuang Po Chang, 4F., No. 23, Lane 458, Bei-an Rd., Jhongshan District, Taipei (TW), 104

( * ) Notice: Subject to any disclaimer, the term of this patent is extended or adjusted under 35 U.S.C. 154(b) by 0 days.

(21) Appl. No.: 10/703,911

(22) Filed: Nov. 7, 2003

(65) Prior Publication Data

US 2005/0098405 A1 May 12, 2005

(51) Int. Cl.[7] .............................................. H02G 11/02
(52) U.S. Cl. ..................................................... 191/12.4
(58) Field of Search .......................... 191/12 R, 12.2 R, 191/12.4

(56) References Cited

U.S. PATENT DOCUMENTS

| | | | | |
|---|---|---|---|---|
| 5,453,585 A | * | 9/1995 | Lenz et al. | ............ 191/12.2 R |
| 6,059,081 A | * | 5/2000 | Patterson et al. | ...... 191/12.2 R |
| 6,230,860 B1 | * | 5/2001 | Wu | ........................ 191/12.2 R |
| 6,679,448 B1 | * | 1/2004 | Carpenter et al. | ....... 242/385.3 |

* cited by examiner

Primary Examiner—S. Joseph Morano
Assistant Examiner—Robert J. McCarry, Jr.
(74) Attorney, Agent, or Firm—Birch Stewart Kolasch & Birch LLP

(57) ABSTRACT

A power cord winding and releasing device includes a reel around which a first power cord is wound, a housing formed from upper and lower covers for rotatably receiving the reel therein, and a coiled spring strip fixed in a tubular body of the reel. An upper surface of the reel is a conductive disc to electrically contact with two conductive plates provided on an inner side of the upper cover. The housing is provided at two sides with two through holes, via which the first and a second power cord separately connected to the conductive disc and the conductive plates are extended out of the housing. The first and the second power cord are connected at their respective outer end with a plug and a receptacle. The first power cord may be quickly pulled outward and rewound around the reel in the housing in an orderly state.

7 Claims, 4 Drawing Sheets

POWER CORD WINDING AND RELEASING DEVICE

FIELD OF THE INVENTION

The present invention relates to a device for orderly storing a power cord or an extension cord, and more particularly to a simple power cord winding and releasing device that enables a power cord to be quickly and orderly received therein for convenient storage.

BACKGROUND OF THE INVENTION

With the highly advanced technologies, more and more electric and electronic appliances have been developed and widely used in people's daily life. All these electric and electronic appliances require power cords to obtain required power supply and send electric signals. These power cords tend to become disordered and tangled, and occupy a large space when they are long and large in number. On the other hand, it is possible an electric or electronic appliance is located far away from a power receptacle and requires an extension cord to obtain the power supply. Most currently available extension cords are produced to different standardized lengths. Most users would purchase the longest possible extension cord for use in all possible conditions. In the event only a short extension cord is needed, the extra length of the long extension cord is usually wound and tied together. And, the wound and tied portion of the long extension cord must be loosened and extended when the electric or electronic appliance is removed to a different place for use and the extension cord must be adjusted in length. After the electric or electronic appliance has been relocated in place, the extra length of the extension cord must be troublesomely wound and tied again. Moreover, a long extension cord that is not in use and arbitrarily wound and tied into a big and loose body is not convenient for storage.

It is therefore tried by the inventor to develop a device for easily winding and releasing a power cord, so that the power cord could be quickly set to an orderly state for convenient storage or use.

SUMMARY OF THE INVENTION

A primary object of the present invention is to provide a power cord winding and releasing device that enables a power cord to be quickly and orderly received therein for convenient storage or use. To achieve the above and other objects, the device mainly includes a reel around which a first power cord is wound, a housing formed from upper and lower covers for rotatably receiving the reel therein, and a coiled spring strip fixed in a tubular body of the reel to enable an automatic rewinding of the outward pulled first power cord around the reel. An upper surface of the reel is a conductive disc to electrically contact with two conductive plates provided on an inner side of the upper cover. The housing is provided at two sides with two through holes, via which the first and a second power cord separately connected to the conductive disc and the conductive plates are extended out of the housing. The first and the second power cord are connected at their respective outer end with, for example, a plug and a receptacle. The first power cord may be quickly pulled outward and rewound around the reel in the housing in an orderly state.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
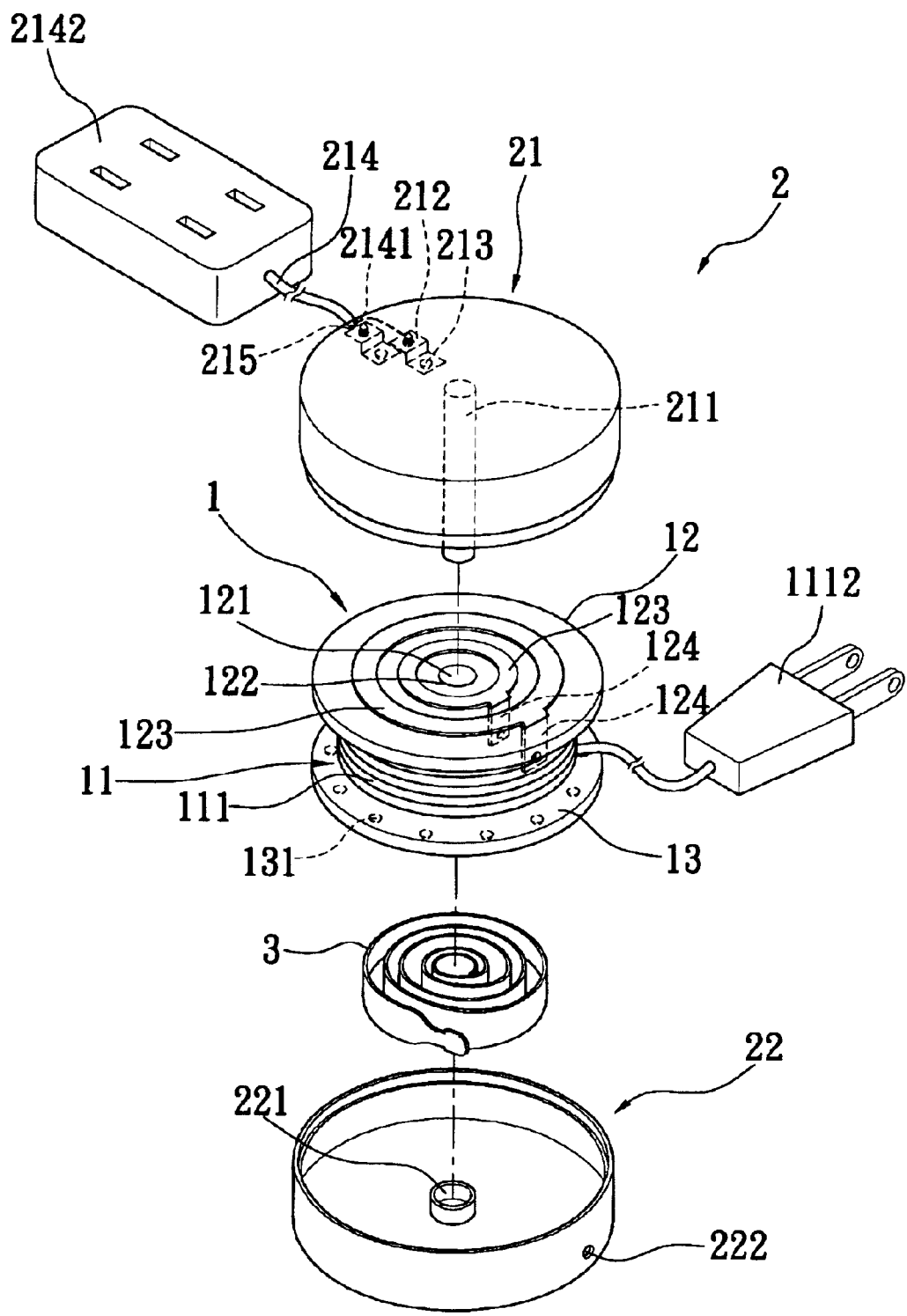
FIG. 1 is an exploded perspective view of a power cord winding and releasing device according to a first embodiment of the present invention.
Figure 2:
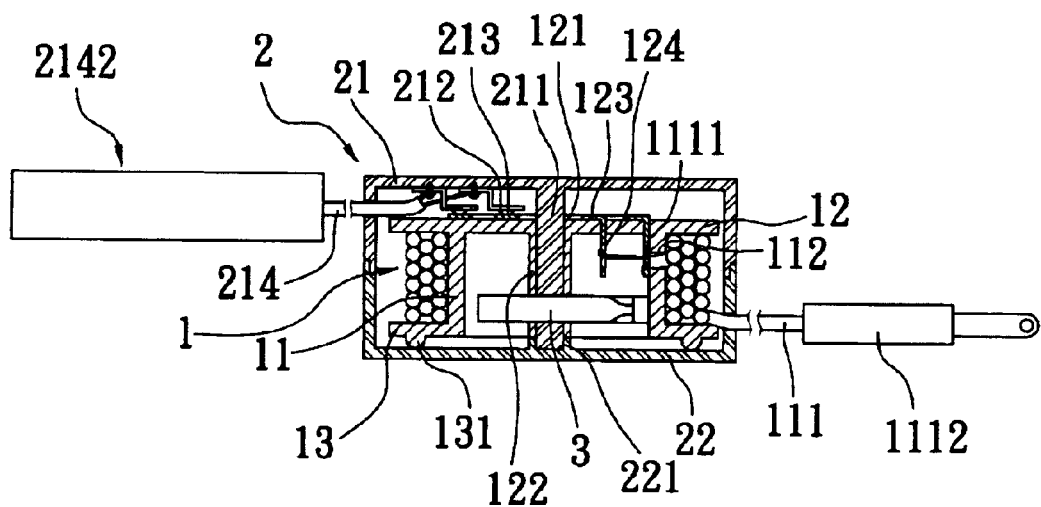
FIG. 2 is a sectioned side view showing the power cord winding and releasing device of FIG. 1 in use.

Please refer to FIGS. 1 and 2 that are exploded perspective and sectioned side views, respectively, of a power cord winding and releasing device according to a first embodiment of the present invention. As shown, the power cord winding and releasing device mainly includes a reel 1, a housing 2 for receiving the reel 1 therein, and a coiled spring strip 3 mounted in the reel 1.

The reel 1 includes a diameter-reduced round tubular body 11 defining an inner space therein, an upper end formed into a diameter-increased conductive disc, and an open lower end having a radially outward extended flange 13.

The tubular body 11 is provided at one side with a first through hole 112 (see FIG. 2), via which an inner end 1111 of a first power cord 111 is inserted into the tubular body 11 to locate in place. Other portions of the first power cord 111 outside the first through hole 112 are wound around an outer surface of the diameter-reduced tubular body 11. A plug 1112 is connected to an outer end of the first power cord 111 to form a first end of the power cord winding and releasing device of the present invention.

The conductive disc 12 is provided at a center with a shaft hole 121. An inner peripheral edge of the shaft hole 121 is downward extended into the tubular body 11 to form a tubular shaft 122 that is ended at the lower end of the reel 1. At least two conductive rings 123 are radially sequentially mounted on the conductive disc 12. Each of the conductive rings 123 includes a conductive leg 124 downward extended from the conductive disc 12 into the inner space of the tubular body 11, so that positive and negative electrodes of the first power cord 111 are connected at the inner end 1111 to the conductive legs 124 of the at least two conductive rings 123.

Figure 3:
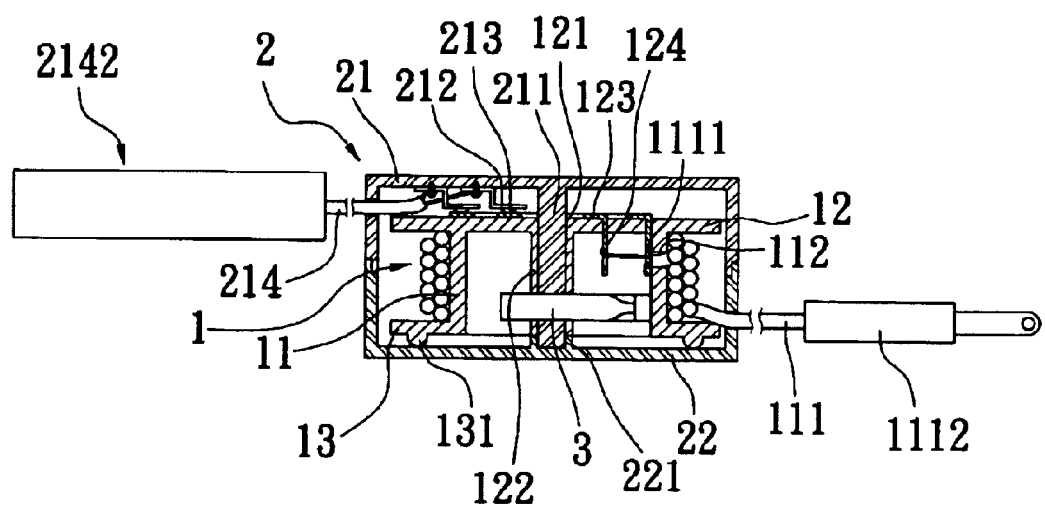
FIG. 3 is another sectioned side view showing the power cord winding and releasing device of FIG. 1 in use.

The lower flange 13 is provided on an underside with a circle of rib 131 as shown in FIGS. 2 and 3, so as to enable the reel 1 to rotate smoothly in the housing 2.

The housing 2 includes an upper and a lower cover 21, 22 that are closed to each other to define an inner space for receiving the reel 1 therein.

The upper cover 21 is around open-bottomed hollow member. A shaft 211 is downward extended from a center of the upper cover 21 to insert into the shaft hole 121 and the tubular shaft 122 of the reel 1. Conductive plates 212 are provided at an inner side of the upper cover 21 facing toward the upper end of the reel 1. Each of the conductive plates 212 is provided at a bottom surface with a rib 213 that is always in contact with one corresponding conducting ring 123 on the conductive disc 12 of the reel 1. The upper cover 21 is provided at one side with a second through hole 215, via which a second power cord 214 is extended into the upper cover 21 to separately connect positive and negative electrodes of the second power cord 214 at an inner end 2141 thereof to the conductive plates 212. A receptacle 2142 is connected to an outer end of the second power cord 214 to form a second end of the power cord winding and releasing device of the present invention.

The lower cover 22 is a round open-topped hollow member. A short insertion tube 221 is upward extended from a center of the lower cover 22 to receive a lower end of the shaft 211 of the upper cover 21 extended through the shaft hole 121 and the tubular shaft 122 of the reel 1. The lower cover 22 is also provided at one side with a third through hole 222, via which the outer end of the first power cord 111 wound around the tubular body 11 of the reel 1 is extended out of the housing 2.

The coiled spring strip 3 is mounted in the tubular body 11 of the reel 1 with an inner end fixed to the shaft 211 of the housing 2 and an outer end fixed to an inner surface of the tubular body 11.

To use the above-described power cord winding and releasing device, simply pull the plug 1112 outward. At this point, the reel 1 inside the housing 2 is brought to rotate about the shaft 211, allowing the first power cord 111 wound around the tubular body 11 to be easily pulled out of the housing 2 via the third through hole 222, as shown in FIGS. 2 and 3. At this point, the coiled spring strip 3 in the reel 1 is brought by the rotating reel 1 into a tightly wound state. When the plug 1112 is released, a restoring force of the tightly wound coiled spring strip 3 automatically rotates the reel 1 in a reverse direction to rewind the outward pulled first power cord 111 around the tubular body 11 of the reel 1. Therefore, the first power cord 111 is quickly and orderly received in the housing 2, and the housing 2 may be then conveniently stored or positioned at a desired location.

Figure 4:
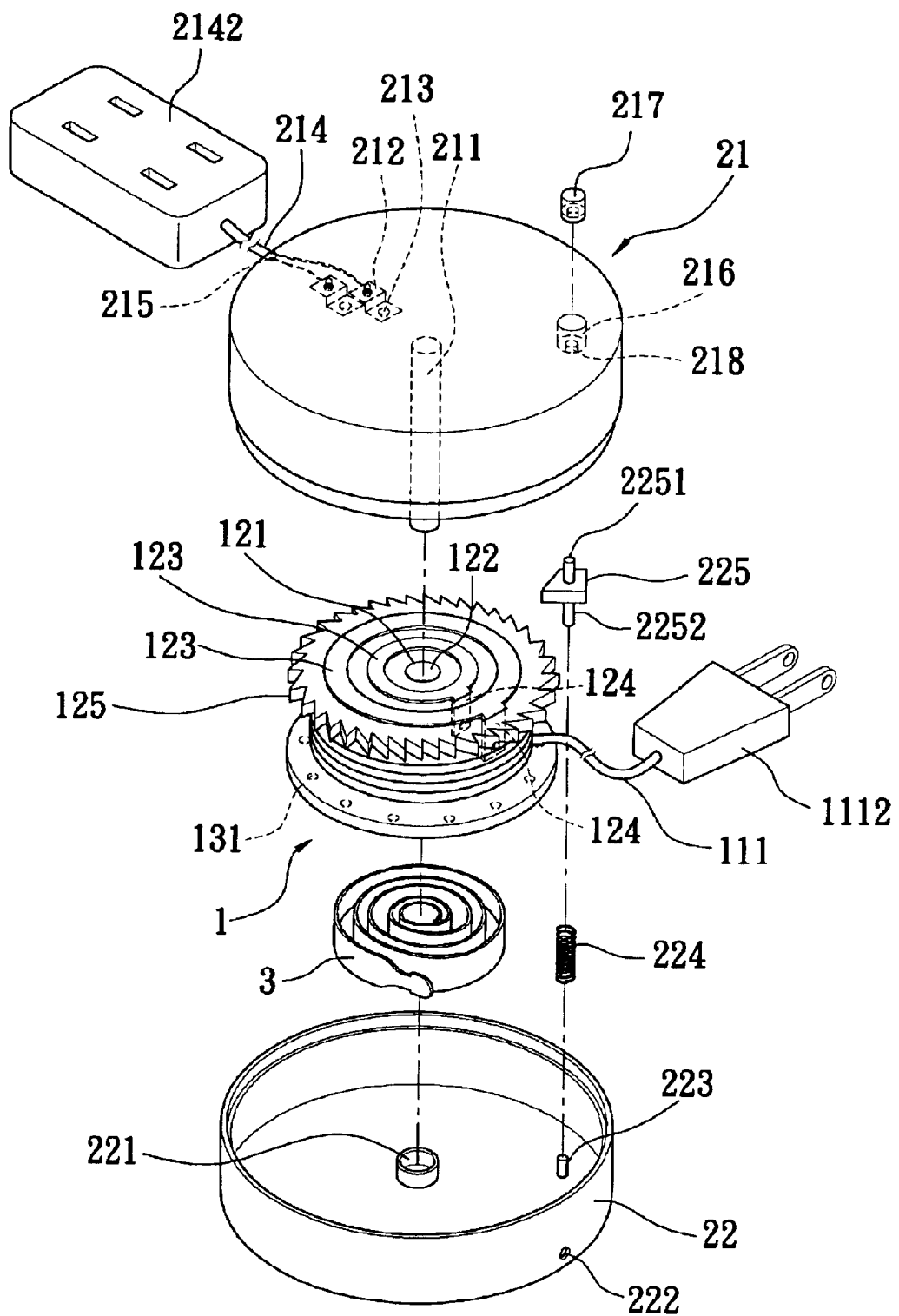
FIG. 4 is an exploded perspective view of a power cord winding and releasing device according to a second embodiment of the present invention.

FIG. 4 is an exploded perspective view of a power cord winding and releasing device according to a second embodiment of the present invention. The second embodiment is different from the first one in that the conductive disc 12 has a toothed outer periphery to form a ratchet wheel 125, that the lower cover 22 is provided at a position corresponding to one side of the ratchet wheel 125 with a stab 223 around which a spring 224 is mounted, that the upper cover 21 is provided on a top at a position corresponding to the stab 223 on the lower cover 22 with a recess 216 for receiving a push button 217 therein and having a through hole 218 formed at a bottom thereof, and that a catch element 225 is provided between the spring 224 mounted on the stab 223 and the push button 217 received in the recess 216.

Figure 5:
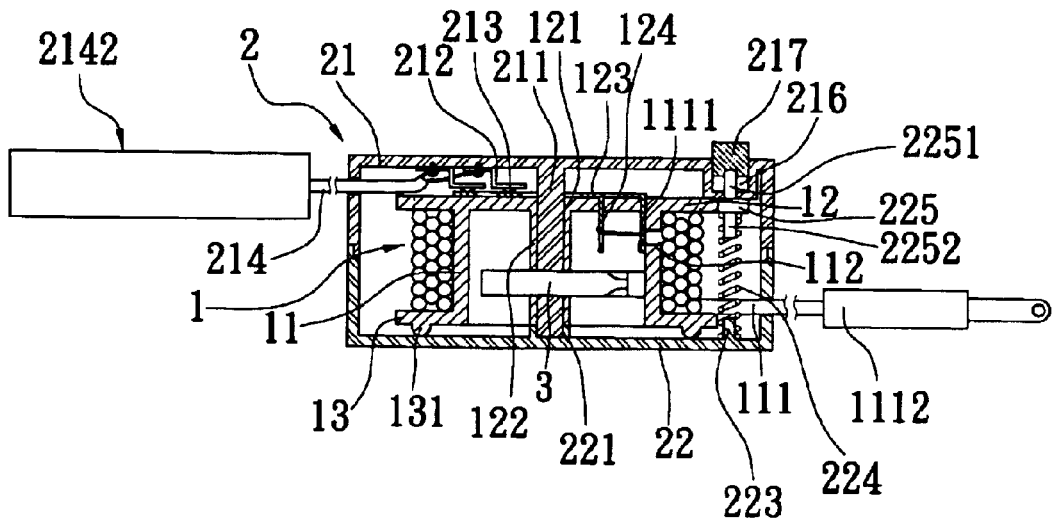
FIG. 5 is a sectioned side view showing the power cord winding and releasing device of FIG. 4 in use.

Please also refer to FIG. 5 that is a sectioned side view of the power cord winding and releasing device according to the second embodiment of the present invention in an assembled state. As shown, the catch element 225 includes a bevel angle adapted to engage with the ratchet wheel 125, an upper bar 2251 vertically extended from an upper side of the catch element 225 into the recess 216 on the upper cover 21 via the through hole 218 to connect to the push button 217, and a lower bar 2252 vertically extended from a lower side of the catch element 225 into an upper end the spring 224.

Figure 6:
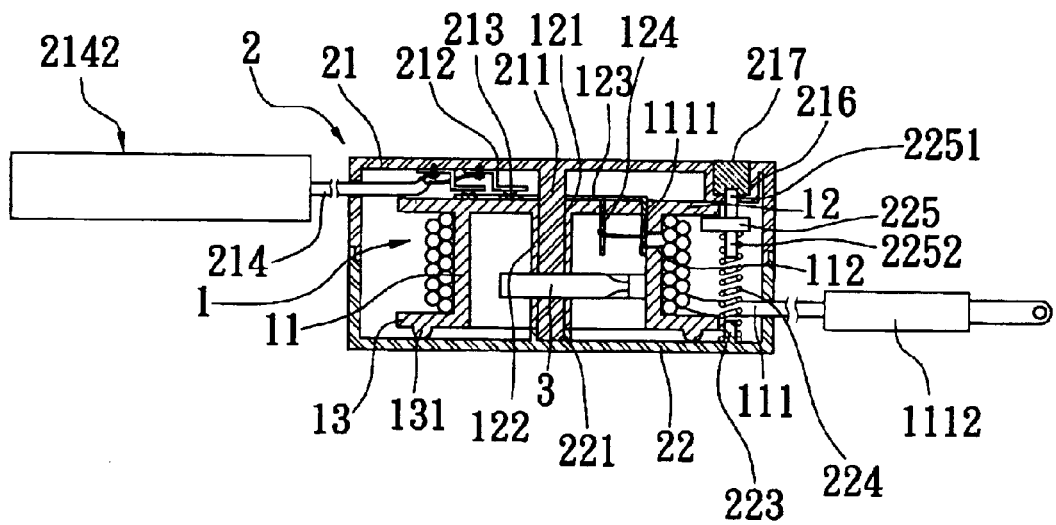
FIG. 6 is another sectioned side view showing the power cord winding and releasing device of FIG. 4 in use.

When the push button 217 is in a normal state without being depressed, as shown in FIG. 5, the push button 217 is upward pushed by the spring 224 to project from the top of the upper cover 22, and the bevel angle of the catch element 225 and the ratchet wheel 125 are in the same one plane. When the plug 1112 is pulled outward and the reel 1 inside the housing 2 is brought to rotate, the ratchet wheel 125, which is also the conductive disc 12 of the reel 1, rotates along a bevel surface of the bevel angle of the catch element 225 without being stopped by the catch element 225, so that the first power cord 111 may be smoothly pulled out of the housing 2 and the coiled spring strip 3 fixed in the rotating reel 1 is simultaneously brought to the tightly wound state. On the other hand, when the plug 1112 is released and the restoring force of the tightly wound coiled spring strip 3 is acted on the reel 1 to rotate the latter in a reverse direction, the reel 1 does not rotate because the ratchet wheel 125 is stopped by a perpendicular surface of the catch element 225 from rotating backward. And, when the push button 217 is depressed, as shown in FIG. 6, the lower bar 2252 of the catch element 225 is caused to downward compress the spring 224, allowing the catch element 225 to move downward and separate from the ratchet wheel 125. At this point, the reel 1 is rotated in a reverse direction by the restoring force of the tightly wound coiled spring strip 3, and thereby automatically rewinds the first power cord 111 around the tubular body 11 in the housing 2. A distance by which the first power cord 111 is pulled out of the housing 2 may therefore be freely adjusted simply by depressing the push button 217 after the first power cord 111 has been pulled outward.

It is to be noted that the first and the second end of the power cord winding and releasing device at the outer ends of the first and the second power cord 111, 214, respectively, are not necessarily connected to a plug 1112 and a receptacle 2142. Other types of connecting elements, such as an earphone and an earplug, may also be connected to the first and the second end, respectively.

The present invention has been described with some preferred embodiments thereof and it is understood that many changes and modifications in the described embodiments can be carried out without departing from the scope and the spirit of the invention as defined by the appended claims.

What is claimed is:

1. A power cored winding and releasing device, comprising a reel, a housing for receiving said reel therein, and a coil spring strip mounted in said reel;

said reel including a diameter-reduced tubular body, an upper end formed into a conductive disc, and an open lower end formed into a radially extended flange;

said reel being provided at a center with a tubular shaft, and on said conductive disc with conductive rings for electrically connecting to an inner end of a first power cord, which is wound around said diameter-reduced tubular body and has an outer end forming a first end of said power cord winding and releasing device;

said housing being internally provided at a center with a shaft extended through said tubular shaft of said reel for said reel to rotatably mount around said shaft, and at an upper inner surface with conductive plates adapted to electrically contact with said conductive rings provided on said conductive disc of said reel;

said conductive plates also being connected to an inner end of a second power cord, which has an outer end forming a second of said power cord winding and releasing device;

said coil spring strip being mounted in said reel in a manner adapted to rotate said reel in a reverse direction when said reel is released from an outward pulling force applied thereto, and thereby causes automatic rewinding of said first power cord around said reel in said housing;

said upper end of said reel is a round conductive disc having a central shaft hole and at least two said conductive rings radially sequentially provided thereon; and said conductive rings respectively have a conductive leg for inserting into said diameter-reduced tubular body of said reel to separately electrically connect said conductive rings to positive and negative electrodes at said inner end of said first power cord.

2. The power cord winding and releasing device as claimed in claim 1, wherein said conductive plates are provided at respective lower surface with a rib.

3. The power cord winding and releasing device as claimed in claim 1, wherein said conductive disc has a toothed outer periphery to form a ratchet wheel.

4. The power cord winding and releasing device as claimed in claim 1, wherein said flange at the lower end of said reel is provided at an underside with a circle of rib to facilitate smooth rotation of said reel about said central shaft of said housing.

5. The power cord winding and releasing device as claimed in claim 1, wherein said housing includes an upper and a lower cover that are closed to each other.

6. A power cord winding and releasing device, comprising a reel, a housing for receiving said reel therein, and a coiled spring strip mounted in said reel;

said reel including a diameter-reduced tubular body, an upper end formed into a conductive disc, and an open lower end formed into a radially extended flange;

said reel being provided at a center with a tubular shaft, and on said conductive disc with conductive rings for electrically connecting to an inner end of a first power cord, which is wound around said diameter-reduced tubular body and has an outer end forming a first end of said power cord winding and releasing device;

said housing being internally provided at a center with a shaft extended through said tubular shaft of said reel for said reel to rotatably mount around said shaft, and at an upper inner surface with conductive plates adapted to electrically contact with said conductive rings provided on said conductive disc of said reel;

said conductive plates also being connected to an inner end of a second power cord, which has an outer end forming a second of said power cord winding and releasing device;

said coil spring strip being mounted in said reel in a manner adapted to rotate said reel in a reverse direction when said reel is released from an outward pulling force applied thereto, and thereby causes automatic rewinding of said first power cord around said reel in said housing; and said housing includes an upper and a lower coder that are closed to each other, said lower cover being provided on a bottom inner surface close to one side with a stab having a spring mounted thereon, and said upper cover being provided on a top at a position corresponding to said stab on said lower cover with a recess for receiving a push button therein and having a through hole provided at a bottom thereof, and wherein a catch element is located between said upper and lower cover with a bevel angle of said catch element being normally in contact with said toothed outer periphery of said ratchet wheel, an upper bar vertically extended from a top of said catch element extending through said through hole on the bottom of said recess of said upper cover to engage with said push button, and a lower bar vertically extended from a bottom of said catch element extending into an upper end of said spring mounted on said stab of said lower cover, so that said push button may be depressed to separate said bevel angle of said catch element from said ratchet wheel.

7. The power cord winding and releasing device as claimed in claim 1, wherein said first and said second end of said power cord winding and releasing device are connected to a plug and a receptacle, respectively.

* * * * *